UNITED STATES PATENT OFFICE.

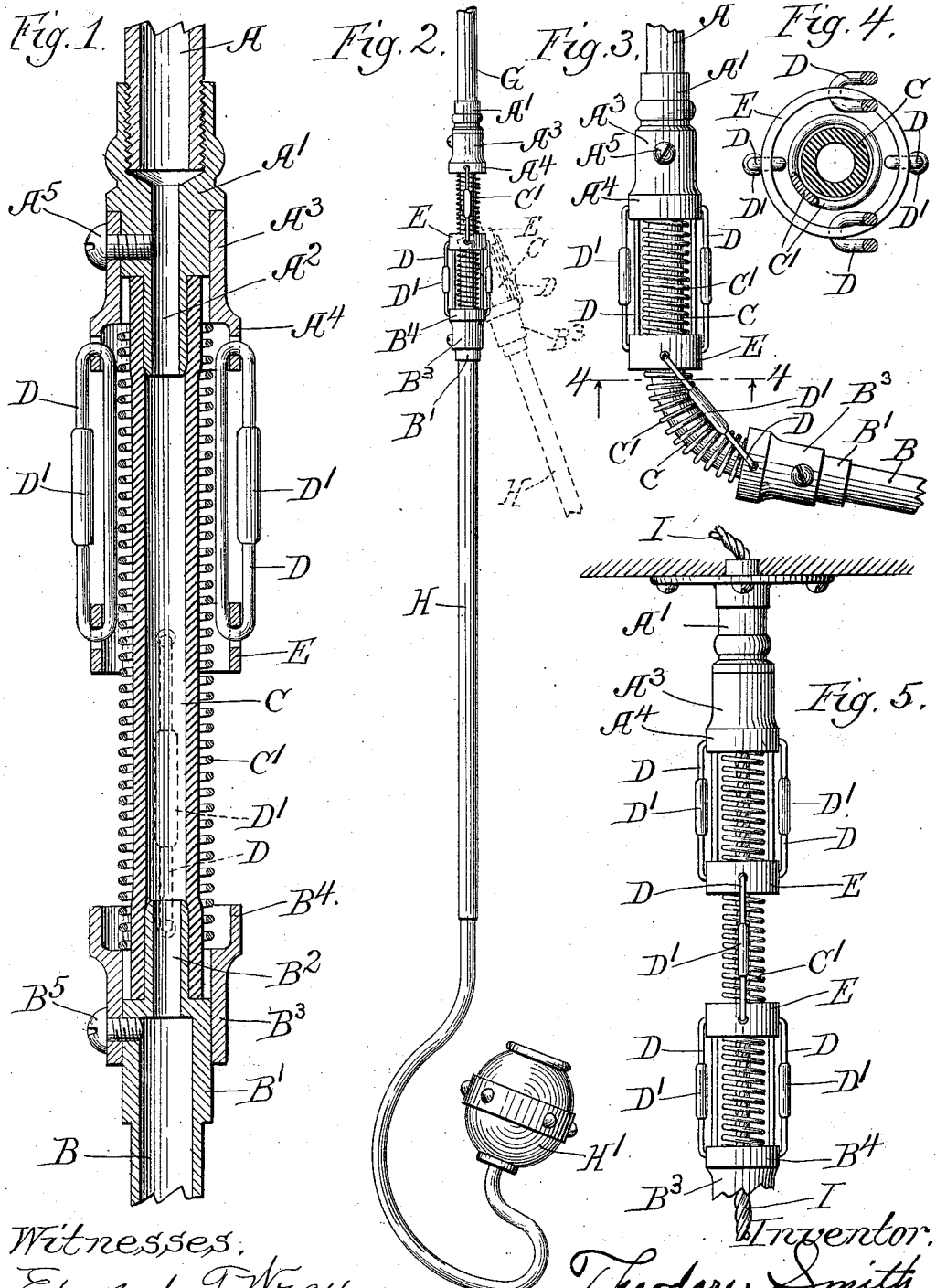

THEODORE SMITH, OF CHICAGO, ILLINOIS, ASSIGNOR TO THEO. SMITH MANUFACTURING COMPANY, OF CHICAGO, ILLINOIS, A CORPORATION OF ILLINOIS.

FLEXIBLE CONNECTION.

1,015,718.      Specification of Letters Patent.      Patented Jan. 23, 1912.

Application filed September 25, 1905. Serial No. 279,942.

*To all whom it may concern:*

Be it known that I, THEODORE SMITH, a citizen of the United States, residing at Chicago, in the county of Cook and State of Illinois, have invented a certain new and useful Improvement in Flexible Connections, of which the following is a specification.

My invention relates to flexible connections particularly adapted for connecting together sections of pipe, hose, tubing or the like through which some fluid is passed, or supporting electrical or gas fixtures or the like, and has for its object to provide a new and improved device of this description.

My invention is illustrated in the accompanying drawings, wherein—

Figure 1 is a sectional view showing a flexible connection embodying the invention; Fig. 2 is a view showing one application of the invention to two sections of gas pipe; Fig. 3 is an enlarged view showing the flexible connection bent; Fig. 4 is a sectional view taken on line 4—4 of Fig. 3; Fig. 5 is a view showing the device applied to an electrical conductor.

Like letters refer to like parts throughout the several figures.

One of the objects of my invention is to provide a flexible connection of the kind described of such construction as to protect the pipe or electrical conductor or the like passing through it, and to permit bending of the connection but to prevent longitudinal extension thereof.

Referring now to Fig. 1, I have shown two sections, A and B, of pipe, hose or the like, which it is desired to flexibly connect together by means of my invention. In this construction the sections are provided with suitable end-pieces, $A^1$ and $B^1$, provided with nipples, $A^2$, $B^2$, over which fit the ends of a flexible pipe or hose, C, which may be of rubber or any other suitable material. The flexible pipe C is provided with a protecting cover, $C^1$, which may be of any suitable material, and as here shown consists of a coil of wire. The end-pieces $A^1$ and $B^1$ have attached thereto sleeves, $A^3$, $B^3$, which project over the ends of the flexible pipe there being a space provided between the nipple and said sleeves for the ends of said pipe. Said sleeves are provided with projecting flanges, $A^4$, $B^4$, beneath which the protecting cover $C^1$ projects. Connected with these projecting flanges $A^4$ and $B^4$ are extension resisting connections, D, consisting of non-elastic connecting pieces, which in the present case are shown as loops. As herein shown there are two sets of these extension resisting connecting devices connected to an intermediate ring, E. As herein shown each set of loops consists of two placed on opposite sides of the flexible pipe, C. When a plurality of extension resisting devices are used the adjacent sets are not in alinement, but one set is placed intermediate the other set. It will be seen that this construction prevents longitudinal extension of the flexible connection. The loops D may be made of any desired rigid material, such, for example, as wire, and when looped in position their ends are connected together in any suitable manner, as by means of sleeves, $D^1$ into which the ends may be soldered. When the connection is bent the inner parts of the loops D strike the faces of the ring E and the sleeves $A^4$ and $B^4$, because of the fact that these sleeves and ring are circular, so as to limit the bending movement, thus preventing the flexible connection from being bent to such a degree as to compress the flexible pipe and thus obstruct or shut off the passage of the fluid through it, or from bending too acutely the flexible device contained within the protecting cover $C^1$. This limiting effect is shown in Figs. 3 and 4, where it will be noticed that the inner part of the loops strike the edge of the ring E.

The sleeves $A^3$ and $B^3$ are held in position in any suitable manner, as by means of the screws $A^5$, $B^5$. It is, of course, evident that any desired number of extension resisting connections may be used, and that the length of the flexible connection will depend upon the conditions presented. It is further evident that the method of connecting the flexible connection to the ends of the pipe or hose may also be varied to meet the conditions, and I have only attempted to show a simple construction for purposes of illustration. This flexible connection may be applied in various manners, such, for example, as the air connection between the different cars of a train, or the connection between sections of gas pipe or the like.

In Fig. 2 I have shown the device applied to a gas cigar lighting device, wherein the two sections of gas pipe, G and H, are connected together by the flexible connection. The part H is comparatively long, and has at one end thereof a cigar lighting device H¹. In this construction the gas lighter may be lifted to light the cigar and too great a flexing of the tube is prevented. If the device is lifted up and dropped the extension resisting devices prevent the tube from stretching so as to cause leaking of the gas. When the device is twisted a torsional force is developed which tends to automatically return the device to its normal position when released.

In Fig. 5 I have shown the device applied to an electrical conductor, I, so as to protect it, and support the fixture. In this construction I have shown a series of the extension resisting connecting devices. It is, of course, evident any number of these can be used so as to make the device of any length desired. In each instance the ends of the adjacent connecting devices will be connected to an intermediate uniting piece.

I claim:

1. A flexible connection comprising two sections, a flexible pipe connected with the sections, a flexible extension resisting connection between said sections, flexibly connected with both of said sections, and comprising four stiff loops, two pivotally connected at one end to each section, a connecting piece between the sections, the other ends of all of said loops pivotally connected to said connecting piece.

2. A flexible connection comprising two sections, a flexible pipe connected to the ends of said sections, a protecting flexible cover for said pipe, an extension resisting connection between the sections of said pipe and comprising two sets of rigid connecting pieces, one set hinged to each section, the two sets hinged to an intermediate ring, said sections enlarged at their ends so as to provide a space between the inner faces and said flexible cover.

3. A flexible connection comprising two sections, a nipple associated with each section, a flexible pipe having its ends inclosing said nipples, a sleeve connected with each section and inclosing said nipples, two loops of rigid material connected with each of said sleeves, said loops connected to an intermediate ring surrounding the flexible pipe.

4. A flexible connection comprising two sections, a flexible extension resisting connection between said sections and comprising a plurality of stiff sets of non-elastic looped connecting pieces, one set movably connected to each section, each set movably connected with an intermediate uniting piece.

5. A flexible connection comprising two sections, a flexible extension resisting connection between said sections and comprising a plurality of stiff sets of non-elastic looped connecting pieces, one set movably connected to each section, each set movably connected with an intermediate uniting piece, the adjacent sets being out of alinement.

6. A flexible connection comprising two sections, a flexible tube between the sections, a flexible protecting cover therefor, a flexible extension resisting connection between said sections and comprising a plurality of sets of non-elastic rigid connecting pieces, one set hinged to each section, each set movably hinged with an intermediate uniting piece, the ends of said sections overhanging and surrounding the ends of said flexible tube and protecting cover so as to inclose and protect such ends.

7. A flexible connection comprising a flexible extension resisting device made up of a plurality of sets of non-elastic rigid connecting pieces out of alinement, the connecting pieces at each end being movably connected to the devices it is desired to connect together so as to be free to move out of alinement therewith, the other ends connected together by a suitable uniting device, said connecting pieces made up of loops which are threaded through holes in the parts with which they are connected.

8. A flexible connection comprising a flexible extension resisting device made up of a plurality of sets of non-elastic rigid connecting pieces out of alinement, the connecting pieces at each end being movably connected to the devices it is desired to connect together so as to be free to move out of alinement therewith, the other ends connected together by a suitable uniting device, and a hollow flexible protecting device associated with said extension resisting device, said connecting pieces made up of loops which are threaded through holes in the parts with which they are connected.

9. A flexible connection comprising two sections, a flexible pipe uniting said sections, a flexible cover for said pipe, sleeves connected with said sections and projecting beyond the ends of said flexible pipe, said flexible cover projecting part way into said sleeves, said sleeves enlarged at their ends so as to provide a space between their inner faces and said cover engaging the ends of said flexible cover, a flexible extension resisting connection connected with said sleeve.

10. A flexible connection comprising two sections and having a space between them, a flexible tube connecting the sections, an extension resisting connection between the sections comprising rigid parts, movably connected with each section on the inner face thereof so as to strike the edges of the sections when the device is bent so as to limit the bending movement.

11. A flexible connection comprising two sections, a flexible tube between the sections, a flexible extension resisting connection between said sections and comprising a plurality of sets of non-elastic, rigid connecting-pieces, one set movably connected to each section and projecting from the inner face thereof, each set connected to an intermediate uniting piece and projecting from the inner face thereof, whereby the said rigid connecting pieces are adapted to engage the edges of said sections and intermediate uniting piece so as to limit the bending movement.

12. A flexible connection comprising two tubes, each having at the end thereof two projecting tubular parts separated by a space, a flexible pipe connected to one tubular part of each tube, and a flexible, non-extensible connection between the other tubular parts of said tubes.

THEODORE SMITH.

Witnesses:
EDWARD T. WRAY,
E. K. REYNOLDS.

Copies of this patent may be obtained for five cents each, by addressing the "Commissioner of Patents, Washington, D. C."